US007666455B2

(12) United States Patent
Resurreccion et al.

(10) Patent No.: US 7,666,455 B2
(45) Date of Patent: Feb. 23, 2010

(54) METHOD FOR ENHANCING RESVERATROL CONTENT OF PEANUT COMPOSITIONS

(75) Inventors: Anna V. A. Resurreccion, Stone Mountain, GA (US); Jaime L. Rudolf, Davis, CA (US); Robert Dixon Phillips, Griffin, GA (US); Manjeet Chinnan, Riverdale, GA (US)

(73) Assignee: University of Georgia Research Foundation Inc., Athens, GA (US)

( * ) Notice: Subject to any disclaimer, the term of this patent is extended or adjusted under 35 U.S.C. 154(b) by 506 days.

(21) Appl. No.: 11/137,604

(22) Filed: May 25, 2005

(65) Prior Publication Data

US 2005/0266143 A1 Dec. 1, 2005

Related U.S. Application Data

(60) Provisional application No. 60/574,602, filed on May 26, 2004.

(51) Int. Cl.
*A23L 1/025* (2006.01)
*A23L 3/32* (2006.01)
*A23P 1/00* (2006.01)

(52) U.S. Cl. ...................... 426/479; 426/237; 426/238; 426/478; 426/629; 426/665

(58) Field of Classification Search ................. 426/238, 426/629, 237, 479, 478, 665; 424/74
See application file for complete search history.

(56) References Cited

U.S. PATENT DOCUMENTS

2003/0228269 A1* 12/2003 DeRosa et al. ............. 424/70.1
2005/0265953 A1* 12/2005 Ennamany et al. ............ 424/74

FOREIGN PATENT DOCUMENTS

| FR | 2837385 | * | 3/2002 |
| WO | WO 03077880 A1 | * | 9/2003 |
| WO | WO 03077881 A2 | * | 9/2003 |

OTHER PUBLICATIONS

Rudolf, J.L., et al., 15C-9, Postharvest of resveratrol in peanut kernels by grinding, http://confex.com/ift/2002/techprogram/paper_11823.htm (2002). Abstract for 2002 Annual Meeting and Food Expo.*
Resurreccion, et al., 2002 Annual Report for Peanut Collaborative Research Support Program, Project No. UGA04, http://168.29.148.65/scripts/reports/annualreport.cfm.

(Continued)

*Primary Examiner*—Brent T O'Hern
(74) *Attorney, Agent, or Firm*—Homer W. Faucett, III; Ice Miller LLP

(57) ABSTRACT

Methods for increasing the amount of resveratrol in a peanut material are provided, comprising the steps of providing a peanut kernel, size-reducing the peanut kernel, abiotically stressing the size-reduced peanut kernel, and incubating the abiotically stressed size-reduced peanut kernel under conditions capable of increasing the amount of resveratrol in the size-reduced peanut kernel. Resveratrol-enhanced peanut compositions prepared according to these methods are also provided.

20 Claims, 2 Drawing Sheets

OTHER PUBLICATIONS

Resurreccion, et al., 2003 Annual Report for Peanut Collaborative Research Support Program, Project No. UGA04, http://168.29.148.65/scripts/reports/annualreport.cfm.
Rudolf, et al., Poster, 2002, Annual IFT Meeting and Food Expo, Anaheim, CA.
Rudolf, et al., Abstract, Postharvest induction of resveratrol in peanut kernals by grinding, 2002, Annual IFT Meeting and Food Expo, Anaheim, CA.
Rudolf, J.L., M.S. Thesis, Development of an HPLC Method for Resveratrol and Optimization of Post-Harvest Stress to Induce Production in Peanuts, 2003, Athens, GA.
Resurreccion, Proposal to the Peanut Foundation, 2003, Maximizing resveratrol in peanuts.
Aguamah, et al., Phytochemistry, 1981, 20:1381-83.
Arora, et al., Plant Science, 1991, 78:157-63.
Cooksey, et al., Phytochemistry, 1988, 27(4):1015-16.
Chung, et al., Plant Science, 2003, 164:103-09.
Dorner, et al., Mycopathologia, 1989, 105:117-28.
Fritzemeier, et al., Planta, 1983, 159:25-29.
Ibern-Gomez, et al., J. Agric. Food Chem., 2000, 48(12):6352-54.
Ingham, J.L., Phytochemistry, 1976, 15:1791-93.
Keen, N.T., Phytopathology, 1975, 65:91-92.
Sanders, et al., J. Agric. Food Chem., 2000, 48(4):1243-46.
Sobolev, et al., J. Agric. Food Chem., 1999, 47(4):1435-39.
Subba Rao, et al., Physiological and Molecular Plant Pathology, 1996, 49:343-57.
Wotton, et al., J. General Microbiology, 1985, 131(3):487-94.
Adrian, et al., J. Agric. Food Chem., 1996, 44(8):1979-81.
Cantos, et al., J. Agric. Food Chem., 2000, 48(10):4606-12.
Cantos, et al., J. Agric. Food Chem., 2001, 49(10):5052-58.
Creasy, et al., J. Amer. Soc. Hort. Sci., 1988, 113(2):230-34.
Creasy, et al., Pharmaceutical Biology, 1998, 36:1-6.
Fritzemeier, et al., Planta, 1981, 151:48-52.
Gonzalez-Candelas, Int. J. Food Microbiol., 2000, 59:179-83.
Jeandet, et al., J. Agric. Food Chem., 2002, 50(10):2731-41.
Kodama, et al., Agric. Biol. Chemicals, 1988, 52(10):2469-73.
Langcake, et al., Physiological Plant Pathology, 1976, 9:77-86.
Langcake, et al., Phytochemistry, 1977, 16(8):1193-96.
Lin, et al., Ultrasound in Med. & Biol., 2001, 27(8):1147-52.
Pezet, et al., Am. J. Enol. Vitic., 1996, 47(3):287-90.
Romero-Perez, et al., J. Agric. Food Chem., 2001, 49:210-15.
Versari, et al., J. Agric. Food Chem., 2001, 49:5531-36.

* cited by examiner

METHOD FOR ENHANCING RESVERATROL CONTENT OF PEANUT COMPOSITIONS

This application claims priority to U.S. Provisional Application No. 60/574,602, filed May 26, 2004, herein incorporated by reference in its entirety.

BACKGROUND OF THE INVENTION

The present invention is directed to increasing resveratrol concentrations in peanuts and peanut products.

The antioxidative activity (AOA) provided by phenolic compounds has been shown to inhibit the oxidation of low density proteins (2), thereby decreasing heart disease risks (3). Phenolic compounds have also been shown to have anti-inflammatory (4) and anti-carcinogic activity (5).

Resveratrol (trans-3,5,4'-trihydroxystilbene), a stilbene phytoalexin, is a phenolic compound possessing antioxidant activity. Resveratrol has been shown to provide health-promoting activities such as lowering the incidence of coronary heat disease (6), provides cancer chemopreventive activity (7) and is a phytoestrogen exhibiting variable degrees of estrogen receptor agonism (8).

Resveratrol can be found in two isomeric forms trans- and cis-resveratrol. Trans-resveratrol is the isomer most abundantly found in nature. However trans-resveratrol is transformed into the cis-isomer after exposure to UV light. Production of resveratrol in plants occurs as a defense response to exterior stress.

Various biotic and abiotic treatments have been shown to increase AOA, total phenolic compounds, and resveratrol concentration in plant material. Biotic factors such as cultivar type (9-11), maturity level (9-11) and microbial exposure have been tested for their elicitation effect on peanuts. In addition abiotic factors such as wounding by slicing in peanut (11, 17, 18), ultraviolet (UV) light exposure on grape and peanut leaves (15, 16, 19-21), ultrasound (22) exposure applied to Panax ginseng cells, and processing methods, such as roasting of peanuts (23), have also been studied as elicitors. Among these methods only the effect of slicing on resveratrol synthesis was studied on peanut kernels.

In one study, the AOA of methanolic extracts of peanut hulls was found to be 94.8 to 93.9% in peanuts harvested at 74 to 144 d after planting (9). In a later study (10), the AOA of methanolic extracts of peanut hulls from Spanish, Valencia, and Runner, and Virginia cultivars were found to be 96.1, 96.8, 96.1 and 96.6%, respectively. These studies show that neither maturity level (9) nor cultivar (10) significantly affects the AOA of methanolic extracts of peanut hulls.

In another study, UV light held at a distance of 110 mm from the surface of methanolic extracts of peanut hull powder for 0, 3, and 6 days resulted in an AOA of 99.7, 96.5, and 96.5%, respectively (24). The findings indicated that UV light had no significant effect on AOA (24). In yet another study, Hwang et al. (23) showed that peanuts roasted at 180° C. for up to 60 min provided remarkable AOA for linoleic acid in emulsion and their antioxidative effect relatively increased with roasting time from 10 to 60 min.

The total phenolic compound concentration of peanut kernels has not been reported in the literature. However, the total phenolic compound concentration has been determined in peanut hulls (9, 10) and defatted peanut flour (25). Yen and Duh (10) concluded that the difference in the amount of total phenolic compounds due to cultivar type was negligible, and that the difference was due to maturity, with more mature peanuts having higher concentrations of total phenolics. Duh and Yen (24) determined the effect of UV light exposure on extracts of peanut hull powder. They found that UV light exposure significantly decreased ($p<0.05$) the amount of total phenolic compounds to 7.80, 7.53 and 7.05 mg/g after exposure to UV light for 0, 3, and 6 d, respectively (24).

Red wine is one of the most common food sources of resveratrol, at an amount of 0.99-5.01 mg/L (26). Trans-resveratrol has also been identified in peanut kernels and processed peanut products. Roasted peanuts contain the lowest content of resveratrol, 0.055±0.023 µg/g, peanut butter contains a significantly higher amount, 0.324±0.129 µg/g, and boiled peanuts have the highest concentration, 5.138±2.849 µg/g (27).

Peanut kernels inoculated with microorganisms are usually sliced (12, 13) or ground (14) prior to treatment. Ingham (12) found that after slicing the ends of peanut kernels, inoculating with Helminthosporium carbonum increased resveratrol from 0 to 38-55 µg/ml after incubation for 24 h at 22° C. Aguamah et al. (13) reported that three phytoalexins increased in peanut kernels soaked in water overnight, sliced, exposed to their natural microflora and incubated. Sobolev et al. (14) later found that fully-imbibed peanut kernels ground into 3-5 mm pieces and inculcated with Aspergillus flavus and A. parasiticus, contained 30 µg/g of resveratrol after incubation.

Microbial exposure has been shown to be an effective elicitor for resveratrol in peanut kernels (12-14). However, such treatment can leave the final product unsafe and inedible. To eliminate microbial influence on the synthesis of resveratrol in peanuts stressed by size-reduction, kernels were surface sterilized with 20% hydrogen peroxide ($H_2O_2$) (18) and 5% sodium hypochlorite (11) prior to stress application. Cooksey et al. (17) found surface sterilized (20% $H_2O_2$) fully-imbibed peanuts sliced 2 mm thick increased resveratrol concentration. These findings indicate that the occurrence of phytoalexins in peanuts is of potential significance as a defense response against mycotoxigenic fungi of the Aspergillus flavus group (17). Arora and Strange (11) also found that sterilized (5% sodium hypochlorite) fully-imbibed, sliced (1-2 mm) peanut kernels increased resveratrol concentration after incubation for 48 h at 20° C.

Exposure to UV light increased synthesis of resveratrol in grape leaves from 0 to 50-100 µg/g after incubation (16). Grapes exposed to UV light contained 50-233.38 and 150.03-400.08 µg/g, respectively (19). Cantos et al. (20) found that mature grapes exposed for 30 min to UV light at a wavelength of 254 nm and incubated for 10 d at 0° C., followed by 5 additional days at 5° C. synthesize higher resveratrol concentrations of 100 µg/g compared to peanuts exposed to UV light at 340 nm resulting in 65 µg/g of resveratrol.

In a more recent study, Cantos et al. (21) developed and characterized an induction modeling method for resveratrol synthesis using UV irradiation pulses on Napoleon table grapes with industrial applicability. The authors found that grapes exposed to UV light at a distance of 40 cm produced higher resveratrol concentrations than at 20 cm, indicating that the UV signal was too strong at the lower distance and the resveratrol "biosynthetic system" was damaged (21). At a distance of 60 cm the induction of resveratrol was delayed compared to that at 40 cm, making the method less feasible for industrial application. Results also showed that the time to achieve the maximum resveratrol level exponentially decreased versus irradiation power. Final selection of optimum conditions was based on economic criteria and included a wavelength of 254 nm (510 W) for 30 s at a distance of 40 cm, which increased resveratrol from 10 µg/g to 115 µg/g (21).

Ultrasound has not been applied specifically as a resveratrol elicitor; however ultrasound has been successfully used in Panax ginseng cells (power density below 82 mW/cm$^3$, 1-4 min) to stimulate the biosynthesis of a secondary metabolite, ginsenoside saponins (22). Cells exposed to ultrasound at a power density of 3.4, 13.7, 34.1, 61.4 and 81.8 mW/cm$^3$ increased saponin concentration from 0.0436 g/L in control cells to a maximum of 0.747, 0.783, 0.775, 0.830 and 0.640 g/L, respectively, after 14 d at 25° C. (22). This study showed that the total ultrasound emitted (i.e., the product of ultrasound power and exposure time) showed a significant correlation with secondary metabolite production.

SUMMARY OF THE INVENTION

The present invention is directed to methods for increasing anitoxidative activity of peanuts and peanut products by increasing total phenolic compounds. Illustratively, the AOA is increased by increasing resveratrol concentration.

In one illustrative aspect of the present invention, a method for increasing the amount of resveratrol in a peanut material is provided, comprising the steps of providing a peanut kernel, size-reducing the peanut kernel, abiotically stressing the size-reduced peanut kernel, and incubating the abiotically stressed size-reduced peanut kernel under conditions capable of increasing the amount of resveratrol in the size-reduced peanut kernel. The method may further comprise any combination of the additional steps of surface-sterilizing peanut kernel, water imbibing the peanut kernel, and removing the testa of the peanut kernel. Optionally, the peanut kernel is sized-reduced by a method selected from the group consisting of chopping, slicing, and grinding, illustratively by slicing into slices about 2 to 8.5 mm in thickness. Optionally, the size-reduced peanut kernel is stressed by a method selected from the group consisting of exposure to UV light, exposure to ultrasound, and a combination of exposure to UV light and ultrasound. In another optional embodiment, the incubating step comprises storing the size-reduced and stressed peanut kernel at about 25° C., illustratively for about 24 to 48 hours. Any combination of size reduction, stressing, and incubation are within the scope of the present invention.

In another illustrative aspect of the present invention, compositions are provided comprising a resveratrol-enriched peanut material produced by a process comprising the steps of size-reducing peanut kernels, abiotically stressing the size-reduced kernels, and incubating the stressed peanut kernels under conditions suitable for increasing the level of resveratrol in the kernels. Optionally, the resveratrol-enriched kernels may be roasted. In yet another optional embodiment, the roasted kernels may be ground, illustratively to produce peanut butter.

In yet another aspect of the present invention, compositions are provided comprising a resveratrol-enriched peanut material produced by a process comprising slicing peanut kernels into slices, exposing the slices to ultrasound, and incubating the stressed slices.

Additional features of the present invention will become apparent to those skilled in the art upon consideration of the following detailed description of preferred embodiments exemplifying the best mode of carrying out the invention as presently perceived.

DETAILED DESCRIPTION

Figure 1:
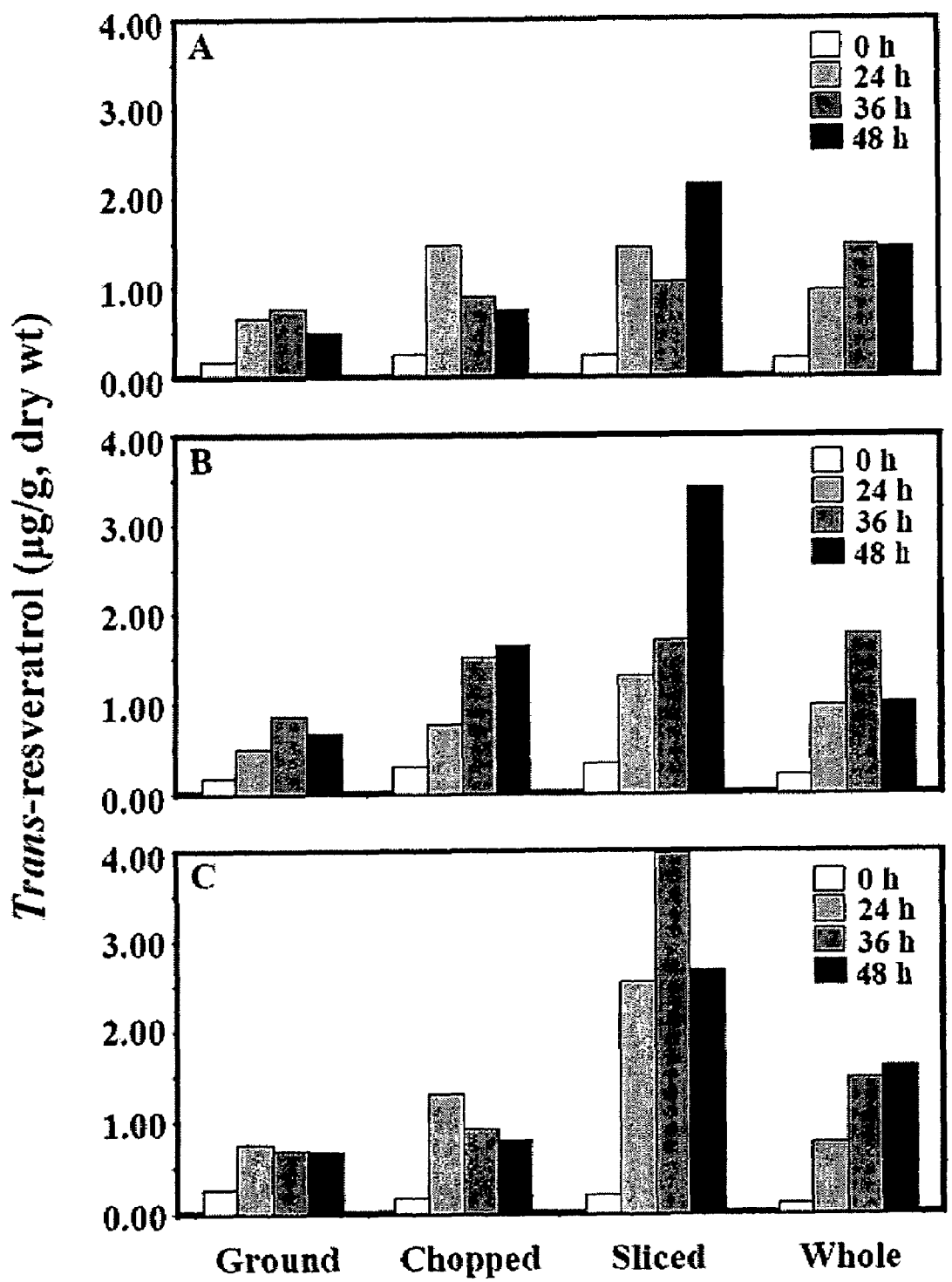
FIGS. 1A-C show mean values for trans-resveratrol concentration in peanut kernels exposed to post-harvest stress by size reduction, grinding, chopping, slicing or whole, and (A) without post size reduction stress or with post size-reduction stress by exposure to (B) UV light or (C) ultrasound over incubation time from 0 to 48 h.

Increases in AOA, total phenolic compounds, and trans-resveratrol in peanut kernels are desirable. Accordingly, exposure to post-harvest stress in peanut kernels has been studied to determine the effect of size-reduction methods such as slicing, chopping, or grinding; to determine the effect of stress application, illustratively by UV light or ultrasound exposure; and to determine the effect of incubation time on AOA, total phenolic compounds, and trans-resveratrol concentration in peanut kernels.

Illustratively, the size-reduction takes place by slicing surface-sterilized, fully imbibed peanut kernels into slices of about 1 mm to about 8.5 mm in thickness, more illustratively about 2 mm, about 4 mm, about 6 mm, about 7 mm, and about 1 cm, and various thicknesses between these thicknesses. In an illustrative example, slices of about 2 mm in thickness were used. In other work, it has been found that slicing to about 7 mm produces excellent results. However, it is understood that other thickness may be used and other methods of size reduction may be used.

Illustratively, the stress is applied using UV light or ultrasound. When UV light is used to apply stress, a light of 254 nm for 2-25 minutes, illustratively for 10 minutes is used. However, this light frequency and time are illustrative only. When ultrasound is used to apply stress, a variety of power densities for various lengths of time may be used. In one embodiment, ultrasound is applied at a power density of 39.2 mW/cm$^3$ is used for about 2-8 minutes at 25°. In one embodiment, ultrasound is applied at this power density for about 4 minutes. However, it is understood that other times and power densities may be used. A combination of UV light and ultrasound may be used as well.

Illustratively, incubation takes place subsequent to stress application, illustratively for about 24 to 72 hours, more particularly about 36 to 48 hours, illustratively at about 25° C.

In one suitable example, surface-sterilized, imbibed peanut kernels are sliced to about 5 mm, stressed, and incubated for about 48 hours. UV light, ultrasound, or a combination of UV light and ultrasound may be used to apply the stress.

EXAMPLE I

Size Reduction and Stress Analysis

Experimental Design. Raw peanut kernels were subjected to post-harvest treatments using a 4×3×4 factorial design. Factors studied were size-reduction methods: chopping, slicing, grinding, and no size-reduction treatment; post size-reduction stress applications: UV light, ultrasound, and no stress application; and incubation times: 0, 24, 36 and 48 h. Three replications of the 48 treatments were conducted for at total of 144 samples. Peanut samples were analyzed for AOA and total phenolic compound concentration in each duplicate for a total of 288 samples per analyses. Duplicate analysis for AOA and total phenolic compounds was conducted generally. However, triplicate analysis was conducted when large variation occurred between results. Trans-resveratrol analyses were conducted in triplicate. Control samples were prepared from untreated raw peanuts.

Sample Preparation. Peanuts used in the analysis were Georgia green medium runners (McCleskey Mills Inc.) harvested in Smithville, Ga. in 2002. The 22.68 kg bag (50 lb.) had been stored under refrigerated storage in a seed storage room at 7° C. for approximately 2 wk prior to the study.

Approximately 3.6 kg of raw peanuts were surface sterilized in 4 L of 20% hydrogen peroxide (Sigma, St. Louis, Mo.) for 15 minutes (17) then rinsed in a sterile colander with 4 L of sterilized deionized water, sterilized by passing through a 0.2 μm nylon filter (Millipore Corporation, Bedford, Mass.). The sterilized peanuts were soaked in 4 L of sterile deionized water for 16 h to reach the maximum water holding capacity of the peanut as determined by preliminary studies. The entire process was conducted under yellow light to avoid resveratrol isomerization (28). It is understood that sterilization using hydrogen peroxide is illustrative, and that other methods of sterilization may be used if necessary, as is appropriate for the particular application.

Size-reduction. Approximately 1.2 kg of sterilized fully-imbibed peanut kernels were reduced by one of the four size-reduction methods as follows. Peanuts were ground into 1-2 mm pieces using a food processor (Model 14181, Sunbeam Oskar, China) for 20 s in 6 batches of 200 g each. Kernels were chopped into 0.5 cm pieces in two batches of 600 g each using a commercial food cutter (Model 84142, Hobart, Troy, Ohio) at 1725 rpm for 30 s. Peanuts were sliced into 2 mm thick pieces, by hand, with a razor blade, a ruler was used as a guide for size. Whole peanut kernels were also collected to represent samples with no size-reduction treatment. Each of the size-reduction batches were collected and mixed by hand with a spoon. All equipment used was sterilized prior to use with 20% hydrogen peroxide.

Post Size-reduction Stress Application. Peanuts from each of the size-reduction treatments were divided into 3 batches of 400 g each then stressed with UV light, ultrasound, or had no further stress application. Peanuts arranged 1 cm in depth on a plastic tray were exposed to UV light for 10 min (20, 21) using a germicidal lamp (254 nm, 30 W, Model UVSL-58, Ultra Violet Products, Inc., San Gabriel, Calif.) placed 40 cm (21) above the surface of the peanuts. Peanuts were stirred after 5 minutes to ensure exposure of UV light to all sides of the kernels.

Ultrasound treatment was performed in a sonic cleaner (Model FS60120V, 29.5 L×15.5 W×14.5 D cm, 260 W, 2.2 A, 50/60 Hz; Fisher Scientific, Fair Lawn, N.J.) with a power density of 39.2 mW/cm$^3$. Approximately 400 g of peanuts were placed into a 1 L glass beaker containing 800 ml of sterile deionized water. The beaker was placed into the sonic cleaner filled with enough water to completely surround the beaker and sonicated for 4 min at room temperature (22). After the sample was sonicated the water was drained from the peanuts by placing them into a sterile colander for 5 min.

Approximately 100 g of sample was stored in half-pint glass mason jars (Ball Corporation, Muncie, Ind.) with two piece lids (Alltrista Corporation, Muncie, Ind.). The mason jars were wrapped with aluminum foil to protect samples from light exposure. Samples receiving none of the stress treatments were immediately placed in jars and incubated. Stress application was done in dim light to prevent trans-resveratrol isomerization (28).

Sample Incubation. Mason jars were incubated at 25° C. (Environmental Growth Chamber, Chargrin Falls, Ohio) for 24, 36 and 48 h. After incubation, the samples were stored at −23° C. until analysis for approximately 1 month.

Extraction of Antioxidants and Total Phenolic Compounds. Each peanut sample was extracted for antioxidants and total phenolic compounds in duplicate. Ten g of each peanut sample was ground and 5 g was placed in a 250 ml centrifuge tube (Nalgene, Rochester, N.Y.) with 50 ml of methanol (Fisher Scientific, Fair Lawn, N.J.). Tubes were shaken for 12 hrs with a wrist action shaker (Model 75, Burrell Corporation, Pittsburgh, Pa.) at ambient temperature, 25° C. The extracts were filtered (Whatman No. 42, England) into a round bottom flask and the residue was extracted again under the same conditions. The combined filtrate in round bottom flask was placed in a water bath (Buchi 461 Water Bath, Switzerland) at 40° C. and evaporated under vacuum in a rotary evaporator (Brinkmann RE 111, Buchi, Switzerland), approximately 30 min, to a final volume of 5 ml.

Analysis of AOA. The AOA of the 144 peanut extracts was determined according to the thiocyanate method of Osawa and Namiki (29) for Eucalyptus leaves as adapted by Duh and Yen (10). AOA was calculated as percent inhibition of oxidation of linoleic acid relative to the control after a 60 min incubation according to Emmons et al. (31).

Analysis of Total Phenolic Compounds. The concentration of total phenolic compounds present in the peanut sample was determined using a spectrophotometric method with Folin-Denis reagent (32) established by Yen and Duh (9). The blue color was measured at 726 nm (33) using a spectrophotometer (Model 8451A, Diode Array Spectrophotometer, Hewlett Packard, Palo Alto, Calif.). Absorbance was measured in triplicate for all peanut samples and standard solutions.

Analysis of Trans-resveratrol. Trans-resveratrol was analyzed using an HPLC method. Trans-resveratrol was extracted following a procedure established by Sanders et al. (34) modified by Rudolf et al. (35) using phenolphthalein as the internal standard. Approximately 35 g of peanut sample was prepared as described by Rudolf et al. (35). The entire procedure was conducted under yellow light to prevent resveratrol isomerization (28).

The dried peanut residue was prepared for HPLC analysis by adding 0.40 ml of 10% ethanol to a vial mixed and filtered into a 300 μL polypropylene plastic insert (National Scientific Co., Lawrenceville, Ga.), to minimize sample volume, which was placed in a 2 ml HPLC amber vial (National Scientific Co., Lawrenceville, Ga.). The vial was sealed with a screw cap that was fitted with a Teflon/silicone septum (National Scientific Co., Lawrenceville, Ga.).

HPLC analyses were performed using a Waters (Waters Corporation, Milford, Mass.) system with a W717 sample injector, W2695 separations module, and W996 photodiode array detector (PDA) set to monitor the UV spectrum from 240 to 400 nm. An Econosphere (Alltech Associates, Inc., Deerfield, Ill.) C 18 reversed-phase column (250 L×4.6 i.d. mm, 5 μm particle size) preceded by an Econosphere C18 (Alltech Associates, Inc., Deerfield, Ill.) guard column (7.5 L×4.6 i.d. mm, 5 μm particle size) was used for analysis.

Trans-resveratrol was analyzed using a reversed-phase HPLC method developed by Rudolf et al. (35). The mobile phase was 0.1% acetic acid (J. T. Baker, Phillipsburg, N.J.) in double deionized water that was filtered through a 0.2 μm nylon filter by vacuum, as solvent A, and 100% acetonitrile (HPLC Grade, Aldrich, Milwaukee, Wis.) as solvent B, with a flow-rate of 1.5 ml/min and the column temperature maintained at 25° C., ambient. The gradient elution increased acetonitrile linearly from 5 to 41.8% over 23 min then increased to 77% over 5 min and finally returned to 5% over 1 min and held for an additional 5 min. Waters Millenium$^{32}$ software, version 3.05 was used to control the HPLC auto sampler, gradient conditions, PDA and data acquisition. Peanut samples were injected at a volume of 80 μL.

Peak areas of trans-resveratrol and phenolphthalein were quantified at 307 nm (27) and 254 nm (35), respectively. Ratios of trans-resveratrol and phenolphthalein peak areas from analysis of peanut samples and standards were used to calculate the concentration of trans-resveratrol using the following equation (35):

Equation 2: $\mu$g of $i$ in sample =

$$\left[\frac{\left(\frac{\mu g \text{ of } i \text{ in standard}}{PA \text{ of } i \text{ in standard}}\right) \times PA \text{ of } i \text{ in sample}}{\left(\frac{\mu g \text{ of } IS \text{ in standard}}{PA \text{ of } IS \text{ in standard}}\right) \times PA \text{ of } IS \text{ in sample}}\right] \times \mu g \text{ of } IS \text{ in sample}$$

where i is trans-resveratrol, IS is phenolphthalein (internal standard) and PA is the peak area. The five levels of standards, 5, 3.125, 1.250, 0.625 and 0.375 ppm ($\mu$g/ml), for trans-resveratrol and phenolphthalein were analyzed at the beginning of each HPLC sample set. Trans-resveratrol concentrations were reported as $\mu$g/g of peanut on a dry weight basis.

Statistical Analysis. Data was analyzed using SAS (37) statistical software Version 8. Regression analysis (PROC REG) was used to relate total phenolic compound concentrations as the dependant variable with peak area as the independent variable. The General Linear Model (PROC GLM) was used to detect significant differences in stress treatments for AOA, total phenolic compounds and trans-resveratrol concentration. Fishers Least Significant Difference (LSD) test was used to compare means of stress treatments on AOA, total phenolic compounds and trans-resveratrol concentration. Pearson's product correlation coefficients (PROC CORR) were calculated between mean AOA, total phenolic compounds and trans-resveratrol concentration.

Results and Discussion

AOA. Results from analysis of variance are presented in Table 1. Incubation time was the only significant factor (p<0.01) that affected AOA. Size-reduction and post size-reduction stress did not significantly affect AOA. Means and their significant differences of AOA are shown in Table 2.

TABLE 1

Results of analysis of variance of the effect of size reduction, stress, incubation time, and their interaction on antioxidant activity in peanut kernels.

| Source of variation | F-value | Prob > F |
|---|---|---|
| Size reduction | 0.57 | 0.6358 |
| Post size reduction stress | 1.1 | 0.3339 |
| Incubation time | 27.18 | 0.0001** |
| Size reduction * incubation time | 0.42 | 0.5191 |
| Size reduction * stress | 0.54 | 0.4618 |
| Incubation time * stress | 0.31 | 0.5765 |
| Size reduction * incubation time * stress | 0.55 | 0.4587 |

*Significant at $\alpha < 0.05$
**Significant at $\alpha < 0.01$

TABLE 2

Mean values for percent antioxidant activity (AOA), measured spectrophotometrically at 500 nm, in peanut kernels treated with 4 size reduction methods and 3 stresses then incubated.[a,b]

| Post size reduction stress | Incubation time (h) | | AOA[c] (%) | | |
|---|---|---|---|---|---|
| | | | Ground | Chopped | Sliced | Whole |
| None | 0 | | 42.30 ± 1.91a | 39.93 ± 1.66 | 40.45 ± 1.41 | 40.81 ± 1.40 |
| | 24 | | 38.41 ± 0.46b | 38.35 ± 0.44 | 39.43 ± 1.29 | 38.93 ± 1.00 |
| | 36 | | 39.46 ± 1.35b | 38.59 ± 1.03 | 41.96 ± 1.01 | 39.58 ± 0.98 |
| | 48 | | 39.83 ± 1.25b | 40.08 ± 1.11 | 40.18 ± 1.06 | 40.59 ± 1.05 |
| | | F-value[d] | 8.93 | 2.83 | 1.25 | 1.83 |
| | | p-value[d] | 0.0007 | 0.0713 | 0.323 | 0.1797 |
| UV | 0 | | 40.59 ± 0.36a | 41.34 ± 1.13a | 43.09 ± 1.01a | 42.97 ± 1.02a |
| | 24 | | 38.42 ± 1.01b | 38.07 ± 0.21b | 38.36 ± 0.67b | 38.11 ± 0.56b |
| | 36 | | 38.53 ± 0.62b | 40.41 ± 1.51a | 38.99 ± 1.76b | 38.66 ± 1.03b |
| | 48 | | 38.38 ± 0.73b | 40.38 ± 1.25a | 42.22 ± 1.54a | 43.50 ± 1.29a |
| | | F-value | 68.84 | 10.27 | 19.79 | 7.78 |
| | | p-value | 0.0035 | 0.0005 | <0.0001 | 0.0017 |
| Ultrasound | 0 | | 43.05 ± 1.15a | 40.27 ± 0.65 | 42.21 ± 1.36a | 39.35 ± 1.33 |
| | 24 | | 37.99 ± 0.72b | 38.44 ± 0.24 | 38.59 ± 1.08bc | 38.30 ± 0.47 |
| | 36 | | 38.62 ± 0.94b | 40.46 ± 1.17 | 38.41 ± 1.46c | 39.84 ± 1.78 |
| | 48 | | 38.62 ± 0.70b | 40.75 ± 1.19 | 40.71 ± 1.17ab | 39.66 ± 1.66 |
| | | F-value | 87.29 | 1.61 | 5.82 | 0.72 |
| | | p-value | <0.0001 | 0.2218 | 0.0085 | 0.5522 |

[a]Means were calculated from three replications with duplicate extractions measured for a total of 6 analyses at each incubation time. When large variation in AOA occurred between samples, triplicate analysis was conducted. Outliers were removed prior to statistical analysis.
[b]For each size reduction method, means from the same stress treatment not followed by the same letter are significantly different at $\alpha < 0.05$ as determined by Fisher's Least Significant Difference mean comparison test.
[c]AOA was the percent inhibition of oxidation of linoleic acid by the peanut sample compared to control containing methanol (31):

$$\text{AOA (\%)} = \frac{100[\ln(\text{control abs}_0/\text{abs}_{60}) - \ln(\text{sample abs}_0/\text{abs}_{60})]}{[\ln(\text{control abs}_0/\text{abs}_{60})]}$$

where AOA is the antioxidant activity, abs is the absorbance of the control or peanut sample tested at 0 and after 60 mm at 25° C., ambient. Untreated control peanuts had an AOA of 39.34 ± 0.87%.
[d]The General Linear Model (PROC GLM) was used to determine the F-value and probability.

AOA of untreated peanut kernels was 39.34±0.87%, which is similar to results from stressed peanuts not exposed to post size-reduction stress at 0 h of incubation, 39.93-42.30%, regardless of size-reduction (Table 2). No literature comparison could be made due to the lack of documentation on peanut kernels. However, results are lower than those reported for peanut hulls, ranging from 94.8 to 93.9% in hulls at varied levels of maturity, 74 to 144 d after planting (9), and 99.7% in untreated hulls (24). Peanut hulls contain large concentrations of phenolic compounds (9, 10), such as the three flavonoids 5,7-dihydroxychromone, eriodictyol and luteolin (38), which function as antioxidants (1). Therefore, hulls are expected to have higher levels of AOA than peanut kernels.

AOA of chopped, sliced and whole peanuts not exposed to post size-reduction stress did not change over incubation from 0 to 48 h. However ground peanuts not exposed to post size-reduction stress had a significant decrease ($\alpha$<0.05) in AOA after 24 h of incubation, then remained stable until 48 h (Table 2).

All peanut samples exposed to UV light had a significant decrease ($\alpha$<0.05) in AOA after 24 h of incubation (Table 2). At 36 h of incubation AOA remained stable, except for chopped peanut samples, at which time AOA increased to levels not significantly different than 0 h of incubation. After 48 h of incubation, AOA of sliced and whole peanuts increased to the initial level (0 h). AOA of ground and chopped peanuts after 48 h remained at the same level after 36 h of incubation. The decrease in AOA for ground peanuts after 24 h though 48 h in this study are contradictory to results found in the literature (24) for methanolic extracts of peanut hulls, where UV exposure did not significantly (p<0.05) affect AOA.

Ultrasound exposure did not have any effect on AOA of chopped and whole peanuts. However, AOA in sliced peanuts exposed to ultrasound decreased from 0 h of incubation after 24 and 36 h, but increased to levels at 0 to 24 h of incubation after 48 h of incubation (Table 2). AOA in ground peanuts did not significantly change after 24 to 48 h of incubation. No literature comparison can be made on the effect of ultrasound exposure to peanuts.

Total Phenolic Compounds. Results from the analysis of variance of total phenolic compounds are presented in Table 3. Time of incubation was the only significant factor (p<0.01) affecting the total phenolic compound concentration in peanut samples (Table 3). Size-reduction and post harvest size-reduction stress did not significantly affect total phenolic compound concentration. Mean values and significant differences of total phenolic compounds are shown in Table 4.

TABLE 3

Results of analysis of variance on the effect of size reduction, stress, incubation time, and their interaction on total phenolic compounds in peanut kernels.

| Source of variation | F-value | Prob > F |
|---|---|---|
| Size reduction | 0.81 | 0.4901 |
| Post size reduction stress | 0.40 | 0.6744 |
| Incubation time | 5.32 | 0.0019** |
| Size reduction * incubation time | 0.17 | 0.6804 |
| Size reduction * stress | 0.93 | 0.3361 |
| Incubation time * stress | 0.42 | 0.5192 |
| Size reduction * incubation time * stress | 0.39 | 0.5347 |

*Significant at $\alpha$ < 0.05
**Significant at $\alpha$ < 0.01

TABLE 4

Mean values for total phenolic compound concentration, measured spectrophotometrically at 726 nm, in peanut kernels treated with 4 size reduction methods and 3 stressed then incubated.[a, b]

| Post size reduction stress | Incubation time (h) | | Total Phenolics[c] (mg/g) | | | |
|---|---|---|---|---|---|---|
| | | | Ground | Chopped | Sliced | Whole |
| None | 0 | | 1.07 ± 0.28 | 0.96 ± 0.43a | 1.19 ± 0.21 | 0.69 ± 0.51c |
| | 24 | | 1.24 ± 0.11 | 1.23 ± 0.36a | 0.92 ± 0.33 | 1.37 ± 0.19a |
| | 36 | | 0.95 ± 0.32 | 0.39 ± 0.21b | 1.13 ± 0.24 | 0.94 ± 0.35b |
| | 48 | | 1.34 ± 0.13 | 1.31 ± 0.28a | 0.87 ± 0.46 | 1.14 ± 0.23b |
| | | F-value[d] | 0.97 | 8.48 | 0.59 | 19.22 |
| | | p-value[d] | 0.4583 | 0.0099 | 0.6461 | 0.0018 |
| UV | 0 | | 1.08 ± 0.32 | 1.16 ± 0.22 | 2.06 ± 0.14 | 1.38 ± 0.16 |
| | 24 | | 1.01 ± 0.24 | 1.35 ± 0.13 | 1.32 ± 0.30 | 1.42 ± 0.15 |
| | 36 | | 1.18 ± 0.17 | 1.20 ± 0.27 | 1.41 ± 0.34 | 1.08 ± 0.61 |
| | 48 | | 1.51 ± 0.24 | 1.41 ± 0.20 | 1.41 ± 0.21 | 1.44 ± 0.18 |
| | | F-value | 1.2 | 0.22 | 1.96 | 1.4 |
| | | p-value | 0.4001 | 0.8758 | 0.2390 | 0.3191 |
| Ultrasound | 0 | | 1.40 ± 0.16a | 0.72 ± 0.43 | 1.58 ± 0.11 | 1.45 ± 0.25 |
| | 24 | | 0.85 ± 0.34b | 1.38 ± 0.21 | 1.09 ± 0.19 | 1.31 ± 0.12 |
| | 36 | | 0.38 ± 0.26c | 1.09 ± 0.36 | 1.23 ± 0.32 | 1.36 ± 0.18 |
| | 48 | | 0.99 ± 0.16ab | 1.30 ± 0.19 | 1.19 ± 0.27 | 1.47 ± 0.21 |
| | | F-value | 10.03 | 1.92 | 1.12 | 0.09 |
| | | p-value | 0.0063 | 0.2150 | 0.4414 | 0.9627 |

[a]Means were calculated from three replications with duplicate extractions measured for a total of 6 analyses at each incubation time. When large variation in total phenolic compounds occurred between samples, triplicate analysis was conducted. Outliers were removed prior to statistical analysis.
[b]For each size reduction method, means for a stress not followed by the same letter are significantly different at $\alpha$ < 0.05 as determined by Fisher's Least Significant Difference mean comparison test.
[c]Total phenolic compound concentration determined in peanut kernels using a regression equation, y = [44.37(AU)x + 0.019(AU/mg/g)] where y is total phenolic compound (mg/g) and x is peak area, are reported above. Untreated control peanuts had 1.35 ± 0.46 mg/g of total phenolic compounds.
[d]The General Linear Model (PROC GLM) was used to determine the F-value and probability.

Untreated peanut samples contained 1.35±0.46 mg/g of total phenolic compounds. Imbibition of peanuts with water has no bearing on total phenolic compounds. Low concentration of total phenolic compounds in whole peanuts not exposed to post size-reduction stress may be a result of method variability due to interfering compounds, described previously. Results show that the peanut kernels contain lower concentrations of total phenolic compounds than peanut hulls, 7.80 mg/g (24), which is expected as hulls are darker in color, and darker color is associated with increased levels of phenolic compounds (38). Total phenolic compound concentration of ground and sliced peanuts not exposed to post size-reduction stress was not affected over incubation for 0 to 48 h. Total phenolic compound concentration in chopped peanuts not receiving post size-reduction stress significantly decreased ($\alpha<0.05$) after 36 h of incubation then increased to levels not significantly different than 0 and 24 h after 48 h (Table 4). Concentration of total phenolic compounds in whole peanuts not exposed to post size-reduction stress significantly increased ($\alpha<0.05$) to a maximum after 24 h of incubation then decreased at 36 h and remained constant after 48 h.

Exposure to UV light had no significant effect on total phenolic compounds, regardless of size reduction or incubation time (Table 4). Results found in the study are contradictory to the literature (24), where a significant ($p<0.05$) decrease in total phenolic compounds occurred in methanolic extracts of peanut hull powder after exposure to UV light. However hull samples in the literature were exposed to UV light over a longer period of time, 6 d (24), compared to 10 min in the present study.

Ultrasound had no significant effect on total phenolic compound concentration in chopped, sliced and whole peanuts (Table 4). Only ground peanuts exposed to ultrasound had a significant decrease ($\alpha<0.05$) in total phenolic compounds after 24 and 36 h of incubation (Table 4). However concentration of total phenolic compounds in ground peanuts increased to levels not significantly different ($\alpha<0.05$) than 0 and 24 h after 48 h (Table 4). A comparison with findings in the literature can not be made due to the lack of reports on this effect.

A large variation occurred in total phenolic compound concentration in chopped and whole peanuts not exposed to post size-reduction stress and ground peanuts exposed to ultrasound (Table 4). Since no trend in total phenolic compound concentration can be identified in these samples, variation could be attributed to method variability.

Trans-resveratrol. Evaluation of the UV spectrum for the peak corresponding to trans-resveratrol in peanut extracts revealed an irregular shape compared to that in standards. However, previous analysis of peanut extracts by GC-MS confirmed that the compound identified was trans-resveratrol. The compound identified had an identical retention time and similar fragmentation pattern to that of trans-resveratrol standard and published data (34, 39).

Results from analysis of variance of trans-resveratrol concentration are presented in Table 5. Size-reduction, post size-reduction stress, incubation time, and the interaction between size-reduction and incubation time were the factors that significantly ($p<0.01$) affected trans-resveratrol concentration in peanut kernels (Table 5).

TABLE 5

Results of analysis of variance on the effect of size reduction, stress, incubation time, and their interaction on trans-resveratrol in peanut kernels.

| Source of variation | F-value | Prob > F |
| --- | --- | --- |
| Size reduction | 27.42 | 0.0001** |
| Post size reduction stress | 3.49 | 0.0319* |
| Incubation time | 6.96 | 0.0002** |
| Size reduction * incubation time | 8.85 | 0.0032** |
| Size reduction * stress | 0.78 | 0.3767 |
| Incubation time * stress | 1.36 | 0.245 |
| Size reduction * incubation time * stress | 0.26 | 0.6123 |

*Significant at $\alpha < 0.05$
**Significant at $\alpha < 0.01$

Significant differences in mean values of trans-resveratrol concentrations are shown in Table 6 and FIG. 1. The highest amount of trans-resveratrol was 3.96±0.96 µg/g, found in sliced peanuts exposed to ultrasound after 36 h of incubation.

TABLE 6

Mean values for trans-resveratrol concentration, measured by reverse-phase high performance liquid chromatography (HPLC) analysis at 307 nm, in peanut kernels treated with 4 size reduction methods and 3 stresses then incubated.[a,b]

| Post size reduction stress | Incubation time (h) | Trans-resveratrol concentration[c] (µg/g) | | | |
| --- | --- | --- | --- | --- | --- |
| | | Ground | Chopped | Sliced | Whole |
| None | 0 | 0.18 ± 0.21b | 0.25 ± 0.87c | 0.22 ± 0.26c | 0.20 ± 0.08c |
| | 24 | 0.65 ± 0.26a | 1.47 ± 0.67a | 1.43 ± 0.54ab | 0.96 ± 0.22b |
| | 36 | 0.76 ± 0.49a | 0.89 ± 0.17b | 1.06 ± 0.90bc | 1.46 ± 0.51a |
| | 48 | 0.49 ± 0.16a | 0.74 ± 0.91b | 2.15 ± 0.63a | 1.44 ± 0.43a |
| | F-value[d] | 4.93 | 31.33 | 8.31 | 47.97 |
| | p-value[d] | 0.0074 | 0.0001 | 0.0015 | 0.0001 |
| UV | 0 | 0.17 ± 0.16c | 0.30 ± 0.12c | 0.33 ± 0.60c | 0.20 ± 0.15c |
| | 24 | 0.49 ± 0.37b | 0.76 ± 0.35b | 1.31 ± 0.54b | 0.97 ± 0.27b |
| | 36 | 0.86 ± 0.14a | 1.52 ± 0.46a | 1.70 ± 0.54b | 1.76 ± 0.72a |
| | 48 | 0.67 ± 0.58ab | 1.64 ± 0.70a | 3.42 ± 0.95a | 0.99 ± 0.58b |
| | F-value | 18.98 | 31.27 | 63.13 | 12.74 |
| | p-value | 0.0001 | 0.0001 | 0.0001 | 0.0001 |

TABLE 6-continued

Mean values for trans-resveratrol concentration, measured by reverse-phase high performance liquid chromatography (HPLC) analysis at 307 nm, in peanut kernels treated with 4 size reduction methods and 3 stresses then incubated.[a,b]

| Post size reduction stress | Incubation time (h) | Trans-resveratrol concentration[c] (µg/g) | | | |
|---|---|---|---|---|---|
| | | Ground | Chopped | Sliced | Whole |
| Ultrasound | 0 | 0.26 ± 0.91c | 0.16 ± 0.13c | 0.20 ± 0.18b | 0.10 ± 0.17c |
| | 24 | 0.75 ± 0.23a | 1.30 ± 0.36a | 2.54 ± 0.54a | 0.76 ± 0.15b |
| | 36 | 0.69 ± 0.20ab | 0.93 ± 0.21b | 3.96 ± 0.96a | 1.47 ± 0.97a |
| | 48 | 0.67 ± 0.28b | 0.80 ± 0.37b | 2.68 ± 0.98a | 1.60 ± 0.42a |
| | F-value | 78.52 | 38.75 | 8.75 | 67.53 |
| | p-value | 0.0001 | 0.0001 | 0.0007 | 0.0001 |

[a]Means were calculated from three replications with triplicate extractions measured for a total of 9 analyses at each incubation time. Outliers were removed prior to statistical analysis.
[b]For each size reduction method, means for a stress not followed by the same letter are significantly different at α < 0.05 as determined by Fisher's Least Significant Difference mean comparison test.
[c]Concentration of trans-resveratrol are reported as a relation to phenolphthalein (internal standard) concentration from the peanut extract (38):

$$\mu g \text{ of i in sample} = \left[ \frac{\left(\frac{\mu g \text{ of i in standard}}{PA \text{ of i in standard}}\right) \times PA \text{ of in sample}}{\left(\frac{\mu g \text{ of IS in standard}}{PA \text{ of IS in standard}}\right) \times PA \text{ of IS in sample}} \right] \times \mu g \text{ of IS in sample}$$

where i is trans-resveratrol, IS is phenolphthalein and PA is the peak area.
Peanut samples were injected at 0.04 ml into a gradient of acetonitrile in acetic acid/water (0.1/9.9, v/v) increasing from 5 to 41.8% over 23 mm then increasing to 77% over 5 min and finally returned to 5% over 1 min and held for an additional 5 min with a flow rate of 1.5 ml/min and column temperature at 25° C. Untreated control peanuts had 0.48 ± 0.08 µg/g of trans-resveratrol.
[d]The General Linear Model (PROC GLM) was used to determine the F-value and probability.

Untreated peanut kernels contained 0.48±0.08 µg/g of trans-resveratrol where as approximately half of that amount (0.18±0.21 to 0.25±87 µg/g) was found in stressed peanuts not exposed to post size-reduction stress at 0 h of incubation. Lower concentrations of trans-resveratrol in the stressed peanut kernels may be a result of soaking the peanuts in water for 16 h prior to size reduction treatment. However results for trans-resveratrol concentration of untreated peanuts are similar to those reported in the literature (34), where peanuts in storage for up to 3 months contained 0.02-1.79 µg/g.

Trans-resveratrol concentration in all peanut samples not receiving post size-reduction stress significantly increased (α<0.05) from 0 to 24 h of incubation (Table 6; FIG. 1). Findings are consistent with those found by Cooksey et al. (17) where resveratrol concentration increased to a range of 4.3 to 23.8 µg/g in eleven different cultivars of peanuts sliced 2 mm thick and incubated for 24 h. In all size-reduced peanuts, the trans-resveratrol concentration remained constant or decreased in concentration from 24 to 36 h. Trans-resveratrol concentration increased in whole kernels from 0 to 48 h of incubation. After 48 h of incubation, trans-resveratrol concentration increased from levels at 0 h of incubation. However, from 36 to 48 h of incubation the concentration remained equal or decreased, except for sliced kernels which increased in resveratrol content. Peanuts that were exposed to size-reduction increased in trans-resveratrol concentration as particle size increased from ground to sliced (FIG. 1). Slicing with 48 h of incubation produced the largest amount of trans-resveratrol (2.15±0.63 µg/g) in peanuts not exposed to post size reduction stress.

In subsequent work, it has been noted that excellent results are obtained with slicing to about 7 mm. Also, slicing to 5 mm results in a good increase in trans-resveratrol concentration.

Exposure of UV light to peanut kernels resulted in a significant increase (α<0.05) in trans-resveratrol concentration as incubation period increased from 0 to 36 h (Table 6). Trans-resveratrol concentration increased from 0 to 24 h of incubation. Then, from 24 to 36 h concentration increased even further. Results are consistent with other studies where UV light exposure to grapes leaves (16) and grapes (19) increased synthesis of resveratrol after incubation for 24 and 23 h, respectively. Trans-resveratrol remained level or increased significantly (α<0.05) from 36 to 48 h in size reduced kernels, but not in whole kernels (Table 6). As particle size increased trans-resveratrol concentration increased, but not in whole kernels (FIG. 1). The highest trans-resveratrol concentration (3.42±0.95 µg/g) in peanuts exposed to UV light was found in sliced peanuts after 48 h of incubation. Creasy and Coffee (19) also found that UV light exposure to grapes and incubation for 48 h increased trans-resveratrol concentration. Fritzemeier and Kindl (40) found that leaves of Vitaceae exposed to UV light stimulated the production of stilbene synthase and catalyzed the reaction of 4-hydroxycinnamoyl-CoA and malonyl-CoA to produce resveratrol.

Ultrasound exposure caused a significant increase (α<0.05) in trans-resveratrol concentration in all samples after 24 h of incubation (Table 6). From 24 to 36 h of incubation, trans-resveratrol concentration decreased or was not significantly different (Table 6). Trans-resveratrol concentration in peanuts incubated for 36 to 48 h did not change (Table 6). In peanuts exposed to size-reduction, trans-resveratrol concentration increased as particle size increased from ground to sliced (FIG. 1). The highest trans-resveratrol concentration in peanuts exposed to ultrasound occurred in sliced kernels at 24, 36 or 48 h of incubation.

The parameters for using UV light and ultrasound have not yet been optimized. It is expected that UV light at other wavelengths, intensities, distances from the bulb, and durations would result in significant trans-resveratrol production. Similarly, ultrasound at other power densities and durations are also expected to be useful. Additionally, it is expected that a combination of UV light and ultrasound, simultaneously or sequentially in either order, would likely result in higher trans-resveratrol concentration.

Relationship between AOA, total phenolic compounds and trans-resveratrol concentration. Significant Pearson's product correlation coefficients (r) obtained between AOA, total phenolic compounds and trans-resveratrol concentration are shown in Table 7. Significant r was found between trans-resveratrol concentration and AOA. However, the magnitude of correlation was low. Since trans-resveratrol has been shown to provide antioxidant activity (1), correlation between the two factors is expected. None of the other combinations tested had significant correlations. These findings are similar to Kahkonen (41), where no significant correlations could be found between the total phenolic content and AOA of plant extracts, berries, fruits, vegetables, cereals, herbs, plant sprouts, seeds and tree leaves and bark. However these results are contradictory to findings by Emmons (31) where total phenolic content was significantly correlated with AOA in oat fractions. Emmons et al. (31) findings suggest that phenolic compounds in the oat might be responsible for a large proportion of the AOA (31).

TABLE 7

Pearson product correlations coefficients (r) among trans-resveratrol concentration, total phenolic compounds and antioxidant activity in chopped, ground, sliced an whole peanut kernels exposed to UV light, ultrasound and none and incubated for 0 to 48 h at 25° C.

| | Trans-resveratrol ($\mu g/g$) | | Total phenolics (mg/g) | | Antioxidant activity (%) | |
|---|---|---|---|---|---|---|
| | r | p-value | r | p-value | r | p-value |
| Trans-resveratrol ($\mu g/g$) | — | — | NS | | 0.2086 | 0.0023 |
| Total phenolics (mg/g) | NS | | — | — | NS | |
| Antioxidant activity (%) | 0.2086 | 0.0023 | NS | | — | — |

*NS is not significant

Application of post-harvest stress by size-reduction and post size-reduction stress by UV light or ultrasound exposure were effective for increasing trans-resveratrol concentration.

Example II

Peanut Butter Preparation

Peanuts were soaked in 12 L of 0.075% hydrogen peroxide ($H_2O_2$, 20%, Sigma, St. Louis, Mo., U.S.A.) solution for 1 min (42). Peanuts were transferred into a sterile strainer to remove the hydrogen peroxide solution and rinsed with filtered (0.2 μm nylon filter, Millipore Corporation, Bedford, Mass., U.S.A.) deionized water. The three batches of peanuts were combined and placed into a plastic tub (53.34 L×33.02 W×20.32 D), sterilized with 5% $H_2O_2$, containing 20 L of filtered deionized water and soaked for 16 h (11) for full imbibition. The water was drained from the peanuts and the kernels were divided into 3 batches, containing 3 kg, for each of the 3 stress treatments.

One batch of peanut kernels was manually sliced using a razor blade on a sterile cutting board into 0.7 cm thick pieces using a template. The remaining two batches were left as whole kernels, ranging from 1.5 to 2 cm in length. Sliced peanuts and one batch of whole kernels were exposed to ultrasound (Model FS60120V, 29.5 L×15.5 W×14.5 D cm, 260 W; Fisher Scientific, Fair Lawn, N.J., U.S.A.), with a power density of 39.2 mW/cm$^3$, by placing 500 g into a 1 L glass beaker filled with 800 ml of filtered dionized water, for a total of 6 batches per treatment. After sonication for 4 min at 25° C. peanuts were placed into a sterile strainer for approximately 5 min, to remove excess water, then transferred to a sterilized quart glass mason jar (Ball Corporation, Munice, Ina., U.S.A.) with two piece lid (Alltrista Corporation, Muncie, Ind., U.S.A.). Each jar was wrapped with aluminum foil (Reynolds 614C, Reynolds Metals Company, Richmond, Va., U.S.A.) to protect samples from light exposure. The entire sample preparation procedure was conducted under dim light to prevent trans-resveratrol isomerizition (28).

After incubation (Environmental Growth Chamber, Chagrin Falls, Ohio, U.S.A.), 100 g of peanuts were left in the jar and stored at −23° C., approximately 1 week, until trans-resveratrol analysis was conducted. Peanuts used for descriptive analysis were placed onto an aluminum screen (29.21× 43.18 cm), not more than 2.54 cm thick, and placed into a mechanical convection oven (645 Freas, Precision Scientific, Winchester, Va., U.S.A.) at 40° C. until moisture was reduced to 10±1% by weight, approximately 24 h.

Peanut butter preparation. Approximately 2.5 kg of the three dried stressed peanut samples and untreated peanuts were roasted separately in a gas roaster (Model L5, Probat In., Memphis, Term., U.S.A.) preheated at 177° C. then maintained at 135° C. while the peanuts roasted. Peanuts were visually inspected for color change every minute. Peanuts were removed from the heated barrel of the roaster, approximately 3 to 4 min, when the color looked similar to a medium roast and cooled a perforated tray in the lower base of the roaster. Once the peanuts were cool, approximately 5 min, the color was determined using a colorimeter (Gardner XL800, Pacific Scientific, Bethesda, Md., U.S.A.) with a circumferential sensor (Gardner XL845, Pacific Scientific, Bethesda, Md., U.S.A.).

The colorimeter was calibrated using a yellow reference standard tile (L=79.56, a=−2.17, b=22.98) prior to sample analysis. Peanut kernels were placed evenly on the bottom of the colorimeter sample cup and four sets of readings were obtained per sample by rotating the cup a quarter of a turn each time (Muego-Gnanasekharan and Resurreccion, 1992) the average of these reading were used in the analysis. Peanuts having a Hunter L-value of 50±1 were not further roasted.

Roasted samples were dry blanched (Model EX, Ashton Food Machinery Co., Inc., Newark, N.J., U.S.A.) to crack and remove the skins and testas. Peanut kernels with remaining testa were put through the blancher an additional time then manually inspected. All peanuts were put through a seed cleaner (Almaco seed cleaner, Allan Machine Company, Ames, Iowa, U.S.A.) to remove remaining testa. It is understood that, while the samples are blanched and testas are removed subsequent to size reduction and incubation, the samples could be blanched and testas could be removed prior to size reduction, or at any other step. Also, depending on the particular embodiment, blanching and removal of the testa may not be necessary.

After roasting, each of the peanut samples were coarsely ground using a colloid mill (Morehouse Industries, Los Angeles, Calif., U.S.A.) set with a stone clearance of 0.25 mm (10 notches). The ground sample was manually mixed in a bowl with a wooden spoon with 1% salt (Morton International Inc., Chicago, Ill., U.S.A.) and 6% corn syrup solids (Star-DRI 42F, A. E. Staley Manufacturing Company, Decatur, Ill., U.S.A.) added by weight (Gills and Resurreccion 2000). The entire contents of the bowl were placed into metal pans (30.48 L×20.32 cm) and placed into a mechanical oven (Model # M01440SC, Lindberg/Blue M, Asheville, N.C., U.S.A.) at 60° C. for 30 min. Samples were removed from the oven and 1.5% stabilizer (Fix-X, Procter & Gamble, Cincinnati, Ohio, U.S.A.) was added, by weight, then the sample was manually mixed with a wooden spoon in the same pan to distribute the stabilizer throughout the peanut butter. Samples were passed through a colloid mill with a stone clearance of 0.1 mm (5 notches), to get a finer grind, and a hot water jacket maintained at 75° C., to disperse the stabilizer. The peanut butter was placed into quart mason jars with two piece lids and stored at 4° C. approximately 1 d until sensory testing was conducted. The mill was cleaned between grinding of each of the different peanut samples.

Sensory evaluation. Subsequent sensory evaluation of the peanut butter revealed that size-reduction and post size-reduction stress exposure do not significantly affect spreadability, texture, and roasted peanut intensity. However, ultrasound exposure did negatively affect overall acceptance, aroma, and flavor. While the addition of flavoring agents and/or dilution with untreated peanut products may be used in any composition herein, the addition of flavoring agents and/or dilution with untreated peanut butter is particularly well suited to improve aroma and flavor for compositions using peanut kernel material that has been exposed to ultrasound as the post size-reduction stress. It has been noted that the effect on flavor is most noticeable when thinner slices were used. Thus, for products where aroma and flavor are more important, such as with peanut butter, size reduction to larger slices (illustratively about 7 to 8.5 mm) may be desirable, whereas for peanut flour or other products for which flavor and aroma are less important, size reduction to smaller sizes (illustratively about 5 mm) to obtain a higher trans-resveratrol concentration may be desirable.

Trans-resveratrol concentration. Evaluation of the UV spectrum, using the PDA, for the peak corresponding to trans-resveratrol in peanut extracts revealed a similar shape to that in the standard solutions and the literature (28). The compound identified in the peanut extracts also had an identical retention time (16 min) to the standard solutions therefore we concluded that the compound identified was trans-resveratrol.

Figure 2:
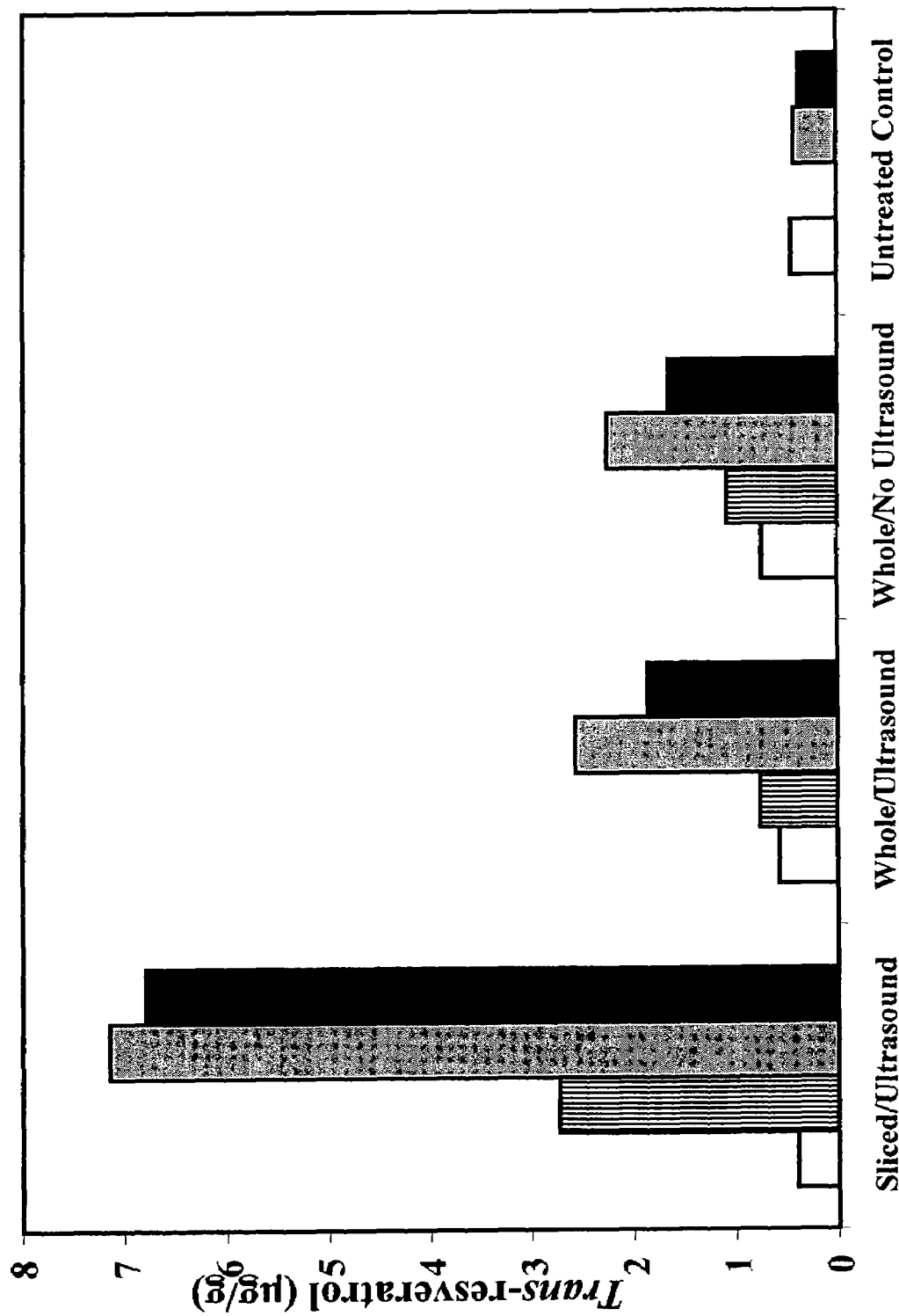
FIG. 2 shows means of trans-resveratrol in peanuts stressed by size-reduction, ultrasound exposure and incubation for 44 h at 25° C. Trans-resveratrol was analyzed before incubation, indicated by the white bars, after incubation for 44 h, indicated by the bar with vertical lines, then after they were dried and roasted to a medium roast with the skin on and off, indicated by the dark gray and black bars, respectively.

Results from analysis of variance of trans-resveratrol are shown in Table 8. Size-reduction, added moisture and time of incubation were significant factors affecting trans-resveratrol concentration in peanut kernels (Table 9). Replication, ultrasound exposure and skin did not significant affect trans-resveratrol concentration in peanut kernels (Table 8). Means of trans-resveratrol concentration for the peanut samples are presented in FIG. 2, Table 9.

After incubation all stressed peanuts had significantly higher trans-resveratrol than untreated control peanuts regardless of drying and roasting. Skin did not significantly affect the trans-resveratrol concentration of peanut samples (Table 8). Therefore, removing the skins prior to processing peanut butter would not affect the trans-resveratrol concentration.

TABLE 8

Analysis of variance of trans-resveratrol concentration for peanut samples stressed by slicing, ultrasound and incubation with skins on or removed and analyzed before and after drying.[1]

| Stress treatment | F-ratios[2] | df[3] |
|---|---|---|
| Rep | 0.2576 | 2 |
| Size-reduction | <0.0001*** | 1 |
| Sonication | 0.2783 | 1 |
| Drying | <0.0001*** | 1 |
| Skin | 0.2222 | 1 |
| Time of incubation | <0.0001*** | 1 |
| MSE[4] | 1.14 | 134 |

[1]Peanuts were stressed by slicing into 0.7 cm or left whole, 1.0 cm, and exposed to ultrasound for 4 min at 25° C. then incubated for 44 h at 25° C. and analyzed for trans-resveratrol before and after drying approximately 24 h at 40° C.
[2]Significant at $*\alpha < 0.05$; $\alpha < 0.01$; $*\alpha < 0.001$
[3]df is degrees of freedom
[4]MSE is mean square error

TABLE 9

Means, standard deviations and significant differences of trans-resveratrol (μg/g) in peanuts stressed by size reduction, ultrasound exposure and incubating at two levels of moisture.[1,2,3]

| | | Stressed[4] | | | | | | Unstressed[5] |
|---|---|---|---|---|---|---|---|---|
| | | \multicolumn{7}{c}{Incubation Time (h)} |
| | | 0 | | | 44 | | | 0 |
| | | \multicolumn{7}{c}{Peanut Size (cm)} |
| | | 0.7 | 1.0 | 1.0 | 0.7 | 1.0 | 1.0 | 1.0 |
| | | | | | \multicolumn{2}{c}{Ultra-sound} | | |
| Drying[6] | Skin | Ultrasound | Ultrasound | None | Ultrasound | Ultrasound | None | None |
| Before | On | 0.40 ± 0.3b | 0.57 ± 0.16ab | 0.74 ± 0.10a | 2.73 ± 0.70a | 0.76 ± 0.04c | 1.08 ± 0.36b | 0.45 ± 0.05d |
| After | On | NA | NA | NA | 7.15 ± 1.27a | 2.57 ± 1.02b | 2.26 ± 0.53b | 0.42 ± 0.04c |
| | Off | NA | NA | NA | 6.80 ± 0.37a | 1.87 ± 0.88b | 1.66 ± 0.10b | 0.38 ± 0.15c |

[1]Means were calculated from 3 replications extracted 3 times for a total of 9 samples.
[2]Means in each row, for each incubation time, not followed by the same letter are significantly different as determined by Fisher's Least Significant Difference (LSD) at $\alpha < 0.05$ mean separation test.
[3]Trans-resveratrol concentration was determined in samples by reverse-phase high performance liquid chromatography and reported on a dry weight basis.
[4]Peanuts were fully imbibed with water then stressed by slicing (0.7 cm) or left whole (1.0 cm), exposed to ultrasound for 4 min at 25° C. then incubated for 44 h at 25° C.
[5]Unstressed control peanuts were not exposed to stress application.
[6]After incubation peanut samples were dried approximately 24 h at 40° C. then roasted at 135° C. for 3-4 min.

After 44 h of incubation peanuts that were sliced and exposed to ultrasound had the highest amount of trans-resveratrol concentration, regardless of drying and roasting (FIG. 8). Although trans-resveratrol concentration appears to be higher in peanut samples with skins there was no significant difference between samples with or without skins. Slicing and ultrasound exposure increased trans-resveratrol concentration to 2.73±0.7 µg/g and 6.80±0.37-7.15±1.27 µg/g in peanuts before and after drying, respectively. An unexpected large increase in trans-resveratrol concentration occurred in peanuts with or without skins after the drying period, 24 h at 40° C. The highest increase in trans-resveratrol was found in sliced peanuts treated with ultrasound. Whereas trans-resveratrol concentration was lower in whole stressed peanuts exposed or not exposed to ultrasound and the lowest in untreated control peanuts.

A previous study (17) showed that resveratrol increased from 4.3-23.8 to 21.2-42.2 µg/g, in eleven different peanut cultivars, as time of incubation increased from 24 to 48 h, respectively, at 25° C. Therefore the increase in trans-resveratrol after the drying period maybe a result of increased incubation time at conditions that promote trans-resveratrol synthesis.

Results for sliced peanuts exposed to ultrasound are higher than findings in a previous study (43) where concentrations increased from 0.48±0.08 µg/g, in untreated peanuts, to 3.96 µg/g in peanuts that were sliced (2 mm), exposed to ultrasound (4 min at 25° C.) and incubated for 48 h at 25° C. In addition, concentrations in this example are much higher than the recent study (43) where trans-resveratrol increased from 0.29 µg/g, in untreated peanuts, to 1.38 µg/g in peanuts that were sliced 0.7 cm and incubated for 48 h at 25° C. Increased amount of synthesis of trans-resveratrol in the current example may have been a result of shorter storage conditions of the peanuts, approximately 1 mo compared to 1 yr in the later (43). Arora and Strange (11) reported a decrease in the ability of cotyledons to synthesize phytoalexins, in response to slicing 1-2 mm and incubating 48 h at 25° C., after storage for 9 mo. In addition the peanuts used in the current example were harvested in a geographic area similar to that in the previous study by Rudolf (43). McMurtrey and others (26) also found that harvest location affects the synthesis of resveratrol in grapes and wine.

Whole peanuts not exposed to ultrasound had significantly higher trans-resveratrol concentration than whole peanuts exposed to ultrasound after 44 h of incubation. However after drying and roasting the trans-resveratrol concentration in whole stressed peanuts was not significantly different.

Untreated control peanuts contained 0.45±0.05 µg/g of trans-resveratrol. Results are similar to findings in the previous study by Rudolf (43) for raw peanut kernels, 0.48±0.08 µg/g. After peanuts were fully-imbibed and exposed to stress, but not incubated, the sliced peanuts contained 0.40±0.03 µg/g, whole peanuts exposed to ultrasound contained 0.57±0.16 µg/g and whole peanuts not exposed to ultrasound contained 0.74±0.10 µg/g of trans-resveratrol.

It is understood that the resveratrol-enhanced peanut material may be processed into various forms, including but not limited to sliced or chopped peanuts, peanut butter, and peanut flour, each of which may be used in various product.

REFERENCES

1. Stojanovic, S.; Sprinz, H.; Brede, O. Efficiency and mechanism of the antioxidant action of trans-resveratrol and its analogues in the radical liposome oxidation. *Arch. Biochem. Biophys.* 2001, 391 (1), 79-89.

2. Frankel, E.; Waterhouse, A. L.; Tessedre, P. L. Principal phenolic phytochemicals in selected California wines and their antioxidant activity inhibiting oxidation of human low-density lipoproteins. *J. Agric. Food Chem.* 1995, 43 (4), 890-894.

3. Hertog, M. L. G.; Feskens, E. J. M.; Hollman, P. C. H.; Katan, M. B.; Kromhout, D. Dietary antioxidant flavonoids and risk of coronary heart disease: the Zutphen elderly study. *Lancet* 1993, 342, 1007-1011.

4. Trouillas, P.; Calliste, C.-A.; Allais, D.-P.; Simon, A.; Marfak, A.; Delage, C.; Duroux, J.-L. Antioxidant, anti-inflammatory and antiproliferative properties of sixteen water plant extracts used in the Limousin countryside as herbal teas. *Food Chem.* 2003, 80, 399-407.

5. Tseng, T.-H.; Hsu, J.-D.; Lo, M.-H.; Chu, C.-Y.; Chou, F.-P.; Huang, C.-L.; Wang, C.-J. Inhibitory effect of Hibiscus protocatechuic acid on tumor promotion in mouse skin. *Cancer Letters* 1998, 126, 199-207.

6. Frankel, E. N.; Waterhouse, A. L.; Kinsella, J. E. Inhibition of human LDL oxidation by resveratrol. *Lancet* 1993, 341, 1103-1104.

7. Jang, M.; Cai, L.; Udeani, G. O.; Slowing, K. V.; Thomas, C. F.; Beecher, C. W. W.; Fong, H. H. S.; Farnsworth, N. R.; Kinghorn, A. D.; Mehta, R. G.; Moon, R. C.; Pezzuto J. M. Cancer chemopreventive activity of resveratrol, a natural product derived from grapes. *Science* 1997, 275, 218-220.

8. Gehm, B. D.; McAndrews, J. M.; Chien, P.-Y.; Jameson, J. L. Resveratrol, a polyphenolic compound found in grapes and wine, is an agonist for the estrogen receptor. *Proc. Natl. Acad. Sci. USA* 1997, 94, 14138-14143.

9. Yen, G.-C.; Duh, P.-D.; Tsai, C.-L. Relationship between antioxidant activity and maturity of peanut hulls. *J. Agric. Food Chem.* 1993, 41 (1), 67-70.

10. Yen, G.-C.; Duh, P.-D. Antioxidant activity of methanolic extracts of peanut hulls from various cultivars. *J. A.O.C.S.* 1995, 72 (9), 1065-1067.

11. Arora, M. K.; Stange, R. N. Phytoalexin accumulation in groundnuts in response to wounding. *Plant Sci.* 1991, 78, 157-163.

12. Ingham, J. L. 3 5,4'-trihydroxstilbene as a phytoalexin form groundnuts (*Arachis hypogaea*). *Phytochemistry* 1976, 15, 1791-1793.

13. Aguamah, G. E.; Langcake, P.; Leworthy, D. P.; Page J. A.; Pryce, R. J.; Strange R. N. Two novel stilbene phytoalexins from *Arachis Hypogaea*. *Phytochemistry* 1981, 20, 1381-1383.

14. Sobolev, V. S.; Cole, R. J.; Dorner, J. W. Isolation, purification, and liquid chromatographic determination of stilbene phytoalexins in peanuts. *J. A.O.A.C. International* 1995, 78 (5), 1177-1182.

15. Langcake, P.; Pryce, R. J. The production of resveratrol by *Vitis vinifera* and other members of the Vitaceae as a response to infection or injury. *Physiological Plant Pathology* 1976, 9, 77-86.

16. Subba Rao, P. V.; Wadia, K. D. R.; Strange, R. N. Biotic and abiotic elicitation of phytoalexins in leaves of groundnut (*Arachis hypogaea* L.). *Physiological and Molecular Plant Pathology* 1996, 49, 343-357.

17. Cooksey, C. J.; Garratt, P. J.; Richards, S. E.; Strange, R. N. A dienyl stilbene phytoalexin from *Arachis hypogaea*. *Phytochemistry* 1988, 27 (4), 1015-1016.

18. Wotton, H. R.; Strange, R. N. Circumstantial evidence for phytoalexin involvement in the resistance of peanuts to *Aspergillus flavus*. *J. Gen. Micro.* 1985, 131, 487-494.

19. Creasy, L. L.; Coffee, M. Phytoalexin production potential of grape berries. *J. Amer. Soc. Hort. Sci.* 1988, 113 (2), 230-234.

20. Cantos, E.; Garcia-Viguera, C.; de Pascual-Teresa, S.; Tomas-Barberan, F. A. Effect of postharvest ultraviolet irradiation on resveratrol and other phenolics of cv. Napoleon table grapes. *J. Agric. Food Chem.* 2000, 48 (10), 4606-4612.

21. Cantos, E.; Espin, J. C.; Tomas-Barberan, F. A. Post-harvest induction modeling method using UV irradiation pulses for obtaining resveratrol-enriched table grapes: a new "functional" fruit?. *J. Agric. Food Chem.* 2001, 49 (10), 5052-5058.

22. Lin, L.; Wu, J.; Ho, K.-P.; Qi, S. Ultrasound-induced physiological effects and secondary metabolite (saponin) production in *Panax ginseng* cell cultures. *Ultrasound in Med & Biol.* 2001, 27 (8), 1147-1152.

23. Hwang, J.-Y.; Shue, Y.-S.; Chang, H.-M. Antioxidative activity of roasted and defatted peanut kernels. *Food Research International* 2001, 34, 639-647.

24. Duh, P.-D.; Yen, G.-C. Changes in antioxidant activity and components of methanolic extracts of peanut hulls irradiated with ultraviolet light. *Food Chem.* 1995, 54, 127-131.

25. Maga, J. A; Lorenz, K. Gas-liquid chromatography separation of the free phenolic acid fractions in various oilseed protein sources. *J. Sci. Food Agric.* 1974, 25 (7), 797-802.

26. McMurtrey, K. D.; Minn, J.; Pobanz, K.; Schultz, T. P. Analysis of wines for resveratrol using direct injection high-pressure liquid chromatography with electrochemical detection. *J. Agric. Food Chem.* 1994, 42 (10), 1997-2000.

27. Sobolev, V. S.; Cole, R. J. Trans-resveratrol content in commercial peanuts and peanut products. *J. Agric. Food Chem.* 1999, 47 (4), 1435-1439.

28. Trela, B. C.; Waterhouse, A. L. Resveratrol: isomeric molar absorptivities and stability. *J. Agric. Food Chem.* 1996, 44 (5), 1253-1257.

29. Osawa, T,; Namiki, M. A novel type of antioxidant isolated form leaf wax of Eucalyptus leaves. *Agric. Biol. Chem.* 1981, 45 (3), 735-739.

30. Nawar, W. W. Lipids. In *Food Chemistry,* 3rd ed.; Fennema, O. R. Ed; Marcel Dekker, Inc.: New York, N.Y., 1996, 276 pp.

31. Emmons, C. L.; Peterson, D. M.; Paul, G. L. Antioxidant capacity of oat (*Avena sativa* L.) extracts. 2. In vitro antioxidant activity and contents of phenolic and tocol antioxidants. *J. Agric. Food Chem.* 1999, 47 (12), 4894-4898.

32. A.O.A.C. *Official Methods of Analysis,* 14th ed. Association of Official Analytical Chemists: Washington, D.C., 1984; 187-188.

33. Zielinski, H.; Kozlowska, H. Antioxidant activity and total phenolics in selected cereal grains and their different morphological fractions. *J. Agric. Food Sci.* 2000, 48 (6), 2008-2016.

34. Sanders, T. H.; McMichael, R. W.; Hendrix, K. W. Occurrence of resveratrol in edible peanuts. *J. Agric. Food Chem.* 2000, 48 (4), 1243-1246.

35. Rudolf, J. L., Resurreccion, A. V. A., Saalia, F. K., Phillips, R. D., Development of a reversed-phase high-performance liquid chromatography method for analyzing trans-resveratrol in peanut kernels. *J. Food Chem.* 2005, 89, 623-638.

36. Macrae, R. *HPLC in food analysis.* 2nd edition; Academic Press Inc.: San Diego, Calif., 1982; pp. 59.

37. SAS. *Statistical analysis system user's guide*, version 8, 4th ed.; SAS Institute, Inc.: Cary, N.C., 1990.

38. Daigle, D. J.; Conkerton, E. J.; Sanders, T. H.; Mixon, A. C. Peanut hull flavonoids: their relationship with peanut maturity. *J. Agric. Food Chem.* 1988, 36 (6), 1179-1181.

39. Lamikanra, O., Grimm, C. C., Rodin, J. B., Inyang, I. D. Hydroxylated stilbenes in selected American wines. *J. Agric. Food Chem.* 1996, 44 (4), 1111-1115.

40. Fritzemeier, K.-H.; Kindl, H. Coordinate induction by UV light of stilbene synthase phenylalanine ammonia-lyase and cinnamate 4-hydroxylase in leaves of Vitaceae. *Planta* 1981, 151, 48-52.

41. Kahkonen, M. P.; Hopia, A. I.; Vuorela, H. J.; Rauha, J.-P.; Pihlaja, K.; Kujala, T. S.; Heinonen, M. Antioxidant activity of plant extracts containing phenolic compounds. *J. Agric. Food Chem.* 1999, 47 (10), 3954-3962.

42. Clavero M R S, Hung Y-C, Beuchat L R, Nakayama T. 1994. Flavor, color and texture of peanuts treated with hydrogen peroxide. Peanut Science 21(1):1-4.

43. Rudolf J L. 2003. Development of an HPLC method for resveratrol and optimization of post-harvest stress to induce production in peanuts. [MSc Thesis]. Athens, Ga.: University of Georgia. p. Available from: University of Georgia Library, Athens, Ga.

Although the invention has been described in detail with reference to preferred embodiments, variations and modifications exist within the scope and spirit of the invention as described and defined in the following claims.

The invention claimed is:

1. A method for increasing the amount of resveratrol in a peanut material comprising the steps of
   providing a peanut kernel,
   size-reducing the peanut kernel,
   abiotically stressing the size-reduced peanut kernel, and
   incubating the abiotically stressed size-reduced peanut kernel under conditions capable of increasing the amount of resveratrol in the size-reduced peanut kernel.

2. The method of claim 1, further comprising the step of surface-sterilizing the peanut kernel prior to the size-reducing step.

3. The method of claim 1, further comprising the step of water imbibing the peanut kernel prior to the size-reducing step.

4. The method of claim 1 wherein the peanut kernel is sized-reduced by a method selected from the group consisting of chopping, slicing, and grinding.

5. The method of claim 4 wherein the peanut kernel is sized-reduced by slicing into slices about 2 to 8.5 mm in thickness.

6. The method of claim 5 wherein the peanut kernel is sized-reduced by slicing into slices of about 5 mm in thickness.

7. The method of claim 1 wherein the size-reduced peanut kernel is stressed by a method selected from the group consisting of exposure to UV light, exposure to ultrasound and exposure to UV light and ultrasound.

8. The method of claim 1 wherein the stressing step takes about 2 to about 10 minutes.

9. The method of claim 1 wherein the incubating step comprises storing the size-reduced and stressed peanut kernel at about 25° C.

10. The method of claim 9 wherein the incubating step takes place for at least 24 hours.

11. The method of claim 1 wherein
    the size-reducing step comprises slicing the peanut kernel into slices between about 2 mm and about 1 cm in thickness
    the stressing step comprises exposing the slices to ultrasound for about 4 minutes,
    the incubating step takes place at about 25° C. for about 36 hours, and further comprising the step of
    imbibing the slices with an aqueous medium.

12. The method of claim 1 further comprising the step of removing the testa of the peanut kernel.

13. The method of claim 1 wherein
    the stressing step comprises exposing the size reduced peanut kernel to ultrasound.

14. The method of claim 13 wherein
    the size-reducing step comprises slicing the peanut kernel into slices between about 2 mm and about 7 mm in thickness, and the incubating step takes place at about 25° C. for about 48 hours.

15. The method of claim 13 wherein the stressing step further comprises exposing the slices to UV light.

16. The method of claim 1 wherein the size-reducing step comprises slicing the peanut kernel into slices of about 5 mm in thickness, and the incubating step takes place for about 48 hours.

17. A composition comprising a resveratrol-enriched peanut material produced by a process comprising the steps of size-reducing peanut kernels, abiotically stressing the size-reduced kernels, and incubating the stressed peanut kernels under conditions suitable for increasing the level of resveratrol in the kernels.

18. The composition of claim 17 wherein the process further comprises roasting the incubated stressed peanut kernels.

19. The composition of claim 17 wherein the composition is a peanut butter and the process further comprises grinding the roasted stressed peanut kernels.

20. A composition comprising a resveratrol-enriched peanut material produced by a process comprising slicing peanut kernels into slices, exposing the slices to ultrasound, and incubating the stressed slices.

* * * * *